United States Patent [19]
Divan et al.

[11] Patent Number: 5,619,406
[45] Date of Patent: Apr. 8, 1997

[54] MODULATOR FOR RESONANT LINK CONVERTERS

[75] Inventors: Deepakraj M. Divan; Ian Dobson; Glen A. Luckjiff, all of Madison, Wis.

[73] Assignee: Wisconsin Alumni Research Foundation, Madison, Wis.

[21] Appl. No.: 491,542

[22] Filed: Jun. 16, 1995

[51] Int. Cl.$^6$ .............. H02M 1/12; H02M 1/14; H02M 3/24; H02M 5/42
[52] U.S. Cl. .............. 363/98; 363/41
[58] Field of Search ............ 363/17, 41, 98, 363/132

[56] References Cited

U.S. PATENT DOCUMENTS

| | | | |
|---|---|---|---|
| 4,722,042 | 1/1988 | Asano et al. | 363/98 |
| 4,730,242 | 3/1988 | Divan | 363/37 |
| 4,833,584 | 5/1989 | Divan | 363/37 |
| 4,864,483 | 9/1989 | Divan | 363/37 |
| 4,879,504 | 11/1989 | McVey | 323/272 |
| 4,942,511 | 7/1990 | Lipo et al. | 363/167 |
| 4,947,101 | 8/1990 | McVey | 323/272 |
| 5,181,032 | 1/1993 | Ribner | 341/143 |
| 5,272,615 | 12/1993 | Wert | 363/41 |

OTHER PUBLICATIONS

T.G. Habetler & D.M. Divan, "Performance Characterization of a New Discrete Pulse Modulated Current Regulator", 1988 IEEE IAS Ann. Meeting, pp. 395–405.

G. Venkataramanan, et al., "Discrete Pulse Modulation Strategies for High–Frequency Inverter Systems", 20th Ann. IEEE PESC, pp. 1013–1020, 1989.

G. Venkataramanan & D. Divan, "Pulse Width Modulation with Resonant DC Link Converters", 1990 IEEE IAS Ann. Meeting, pp. 984–990.

Jin–Woo Lee, et al., "A New Quasi–Resonant DC Link Inverter", EPE Firenze, vol. 4, pp. 202–206, 1991.

*Primary Examiner*—Peter S. Wong
*Assistant Examiner*—Bao Q. Vu
*Attorney, Agent, or Firm*—Foley & Lardner

[57] ABSTRACT

A modulator for resonant DC link and other power converters is provided having superior performance and general applicability to multi-phase converters. The modulator includes three major components: (1) a multi-input, multi-output linear system, (2) a quantizer, and (3) a latch. The linear system receives multiple reference signal waveforms and multiple feedback signal waveforms representative of the modulator output as input signals and produces multiple linear output signals derived from the difference between the reference and feedback waveforms as outputs. The linear system is preferably a second order system. The quantizer assigns the continuous output of the linear system to one of a finite set of discrete output vectors. The output of the quantizer is latched at a sampling rate synchronized with the times of zero voltage or current on the DC bus of the converter. The latched outputs are used as both control signals, to control the inverter output switching devices, and to derive the feedback waveform signals provided to the linear system. The modulator may be provided as part of a resonant DC link inverter or as part of a control system for such an inverter.

38 Claims, 12 Drawing Sheets

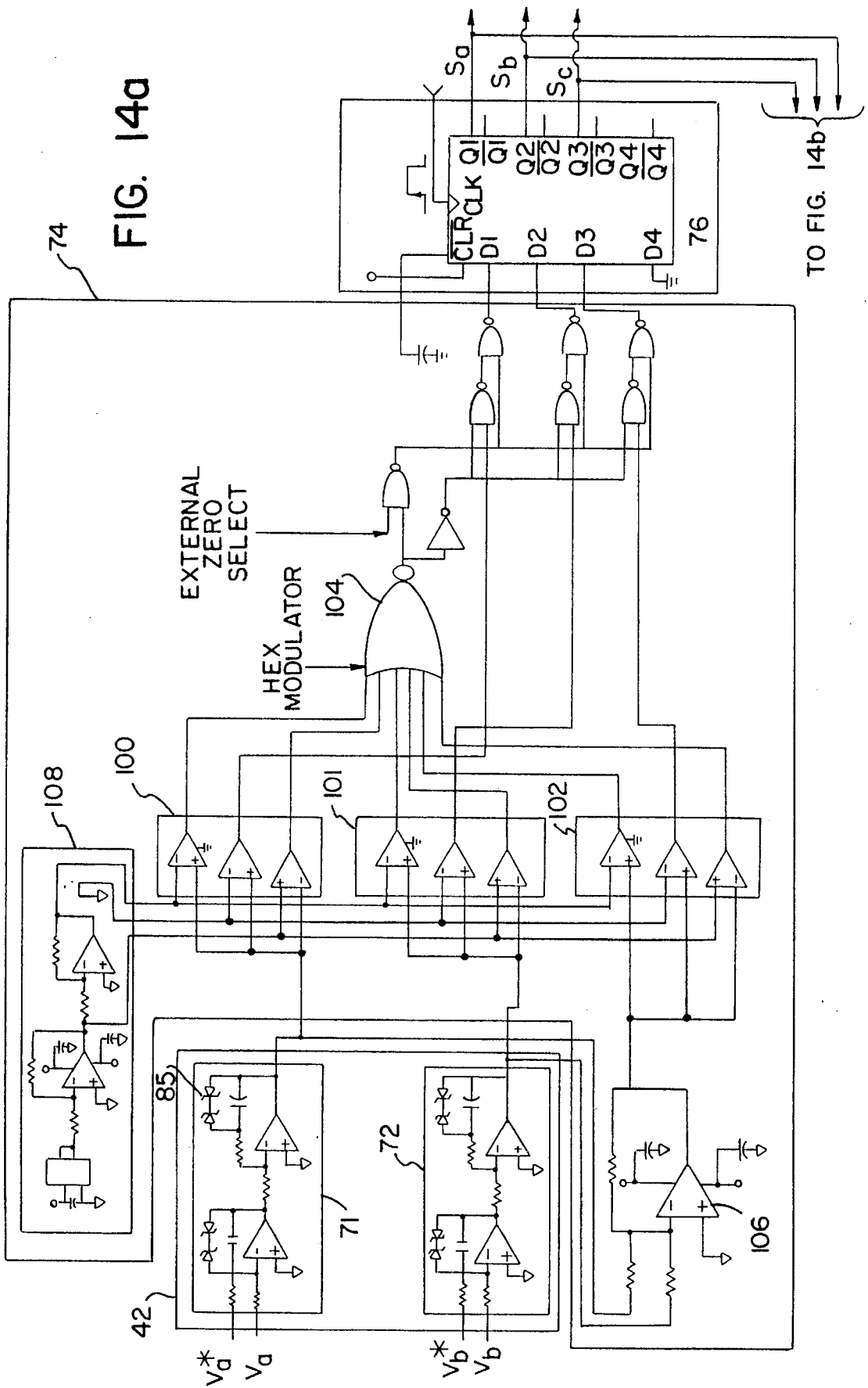

MODULATOR FOR RESONANT LINK CONVERTERS

FIELD OF THE INVENTION

This invention pertains generally to modulators used for providing control signals to the switching elements of electric power converters, and more specifically to such modulators as employed in resonant link inverters where the switching of the inverter switching elements is limited to instances of zero voltage or current across or through the switching elements.

BACKGROUND OF THE INVENTION

Power conversion devices, such as DC/AC or AC/AC inverters, typically contain switching elements which are implemented as gate turn-off devices such as transistors. Despite the clear advantages of using these self-commutating switching devices over, for example, thyrister switches, the inherent characteristics of available transistor switches impose several performance limitations on inverters employing them. Many of these limitations stem from the turn-on and turn-off losses associated with the switching devices. Switching losses limit the attainable switching frequency. Relatively low switching frequencies can cause acoustic noise problems. Low switching frequencies also result in low amplifier bandwidth and poor load current waveform fidelity (unwanted harmonics). Moreover, the reverse recovery and snubber interactions between the switching device and its associated anti-parallel diode cause high device stresses under regeneration conditions. In turn, the need to withstand the high device stresses reduces reliability and requires that the devices by overspecified. These limitations are characteristic of "hard-switching" inverters wherein the inverter switching elements are switched between the conducting and non-conducting states in the presence of relatively high DC voltages.

Ideally, a power converter should have essentially zero switching losses, a high switching frequency, small reactive components and the ability to transfer power bi-directionally. The system should also be insensitive to second order parameters such as diode recovery times, device turn-off characteristics and parasitic reactive elements.

So-called "soft-switching" inverters offer several of these advantages over standard inverter designs, including virtually zero switching losses, and the associated advantages of high switching speed and moderate dv/dt stresses. In soft-switching power converters, the inverter switching devices are only switched at points in time where there is either no voltage across or no current through the switching device. One such soft-switching topology is the resonant DC link inverter, a circuit which has been shown to be viable in both its voltage source and current source versions. FIG. 1 is a circuit diagram of a conventional, three-phase, resonant DC link inverter. The two main components of the DC resonant link inverter are the DC resonant link 10 and the inverter circuit 17 which are connected at the DC bus terminals 15 and 16. The DC resonant link 10 includes a DC voltage power supply 11, a series DC resonant link inductor 12 (of inductance L), a capacitor 13 (of capacitance C), and a gaited switching device 14 connected across the DC bus terminals 15 and 16 of the resonant link. The inductor 12 and capacitor 13 are connected to form a resonant tank circuit.

To illustrate the operation of the resonant circuit 10, assume that the power supply 11 is initially disconnected from the circuit. If the voltage $V_s$ from the power supply 11 is now applied to the system with the switch 14 off (open circuited), for a loss-less inductor 12 and capacitor 13, the output voltage $V_o$ (with the terminals 15 and 16 disconnected from the inverter circuit 17) will vary between $V_s$ and zero and have an average value of one-half $V_s$, with the output voltage varying at the resonant frequency of the LC resonant circuit composed of the inductor 12 and capacitor 13. Every cycle, the output voltage $V_o$ will return to zero volts, thus setting up the desired condition where loss-less switching may take place. For practical LC circuits having finite Q factors, the output voltage $V_o$ will never return to zero and will finally stabilize at $V_s$. However, if the switch 14 is maintained on and conducting while applying the voltage $V_s$ from the power supply 11, the current in the inductor 12 increases linearly. The switch 14 may then be turned off when sufficient energy is stored in the inductor to ensure that the output voltage $V_o$ will return to zero. At that point, the switch 14 may be turned on once again to repeat the process and establish a stable oscillation of the resonant circuit 10, thereby forming a stable DC resonant link voltage at the DC bus terminals 15 and 16.

The inverter circuit 17 is of standard design, composed of pairs of gate turn-off switching devices (e.g., bi-polar transistors) 20 and 21, 22 and 23, and 24 and 25, having output lines 27, 28 and 29 on which voltages $V_A$, $V_B$ and $V_C$ are provided. Each of the switching devices 20–25 is synchronized to switch at the points in time at which the voltage across the DC bus terminals 15 and 16 goes to zero.

Many other designs for resonant and quasi-resonant power conversion circuits are possible. Other circuit designs may be found in U.S. Pat. Nos. 4,730,242, 4,833,584, and 4,864,483, to Divan, and U.S. Pat. No. 4,942,511 to Lipo, et al., the disclosures of which are incorporated herein by reference.

An inverter modulator is a device which generates control signals for switching the switching devices of an inverter 20–25 in a proper sequence to synthesize an AC waveform on the output lines 27–29 from the DC voltage at the DC bus terminals 15–16. This is accomplished through modulation and switching at a frequency much higher than the frequency of the AC output waveform. The high frequency components of the output waveforms which result from the modulation and switching may be filtered by the loads to which the output lines 27–29 are attached. For example, where the load is an uninterruptible power supply (UPS) the high frequency components of the output may be filtered by transformers or a low pass filter. Where the load is a machine, filtering may be provided by the machine's leakage inductance. In this way, an output signal approximating a sine wave may be achieved. However, any modulation scheme will not produce a perfect sine wave output signal. Some modulation noise may be present on the output voltage signal. The quality of the output voltage signal is determined by the signal-to-noise ratio (SNR) of the output signal.

In the soft-switching resonant DC link inverter, low switching losses are realized by turning the switching devices 20–26 on and off when the bus voltage is zero, an event that occurs almost periodically at a rate given by the bus oscillation frequency. The constraint of switching only at times of zero bus voltage requires a discrete pulse modulation (DPM) scheme for inverter switching control, rather than a more conventional pulse width modulation (PWM) switching scheme employed with hard-switched inverters.

Under PWM, the turn-on and turn-off times of the inverter switching devices 20–25 are varied, thereby varying the duration of the DC pulses which appear on the output lines 27–29, to synthesize an AC output waveform. However, for the resonant DC link inverter, the switch-on and switch-off times are constrained by both the waveform to be synthesized and by the frequency of the resonant link. Since the switching of the switching devices 20–25 is limited to those points in time when the bus voltage is zero, a form of discrete pulse modulation (DPM) must be used.

A modulator implementation that has been used previously to provide discrete pulse modulation of a resonant DC link inverter is the simple interpolative sigma-delta modulator shown in its simplest form in FIG. 2. In this figure, x(t) is the input or reference signal, u(t) is a signal representing the state of the integrator 34, and y(t) is the output of the latch 31. The integrator state signal u(t) is derived from the difference between the reference signal x(t) and the modulator output y(t). The comparator 35 may be thought of as a simple quantizer whose output q(u) is +b or −b according to the sign of the integrator state signal u(t). The latch 31 samples the comparator or quantizer output q(u) at a sampling rate f, and holds that signal until the next sampling instant.

The sigma delta modulator 30 uses feedback to lock onto the scalar band-limited input signal x(t). Unless the reference signal x(t) exactly equals one of the discrete quantizer output levels +b or −b a tracking error results. The integrator 34 accumulates the tracking error over time, and the quantizer and latch feed back a value y(t) that will minimize the accumulated tracking error. Thus, the quantizer output y(t) toggles about the input signal x(t) so that the average quantizer output is approximately equal to the average of the input.

An equivalent discrete time model of a scalar sigma-delta modulator can be given by the following nonlinear difference equation:

$$u_{n+1} = x_n - q(u_n) + u_n \quad (1)$$

where:
x is the input signal;
u is the integrator state; and
q is the output of the quantizer, where:

$$q(u) = \begin{array}{ll} +b & u \geq 0 \\ -b & u < 0 \end{array} \quad (2)$$

The quantizer 35 can be understood as mapping its input u to +b or −b depending on which is nearest to the input. Thus, the quantizer 35 may be referred to as a nearest neighbor quantizer.

For some design purposes, the operation of the sigma-delta modulator 30 can be analyzed by modeling the integrator 34 with its discrete time equivalent 36 and the quantization process by an additive noise source e(z) as illustrated in FIG. 3. The noise source e(z) may be assumed to be white and statistically uncorrelated. The noise source e(z) represents the introduction of an error into the linear system which is caused by the quantization. The noise source e(z) thus represents the difference between the most desired output of the modulator which would drive the average output waveform to equal the reference waveform x(z), and the actual control signal output of the modulator y(z) which can be obtained given that only two output levels are possible and that these levels can only change at times dictated by the switching frequency $f_s$. Thus, the quantization noise e(z) is the z transform of the quantization error sequence $e_n$ defined by:

$$e_n = q(u_n) - u_n. \quad (3)$$

With this linearized model of the sigma-delta modulator, it can be shown that:

$$q(z) = x(z)z^{-1} + e(z)(1 - z^{-1}). \quad (4)$$

To illustrate how power electronic circuits have been modulated using the simple sigma-delta modulator of FIG. 2, consider the modulator 30 of FIG. 2 as applied to a half bridge inverter 32 as shown in FIG. 4. In this arrangement the half-bridge includes two switching devices 37 and 38 which, it may be noted, may correspond to the switching devices for one phase of the three phase converter 17 of FIG. 1, where the voltages +b and −b impressed across the switching devices may correspond to the voltages on the DC bus terminals 15 and 16. The modulator 30 compares the reference signal x(t), representing a desired inverter output, with the inverter output signal y(t), and provides the resulting error signal to the integrator 34 and one bit comparator 35 with two discrete output levels. The latch 31 is sampled at a frequency $f_s$ which may be synchronized with the points in time at which the bus voltage across the switching devices 37 and 38 reaches zero. Thus, the modulator will be constrained to change the states of the switches 37 and 38 only at times of zero DC bus voltage. The switch state output of the latch 31 drives the switching devices 37 and 38 to impress +b or −b on the output voltage y(t). The comparator 35 and latch 31 set the switch state for each sampling period T=1/f, according to the sign of the input u at the sampling instant to cause the average of the inverter output signal y(t) to be approximately equal to the average of the reference signal input x(t) using feedback of the inverter output signal y(t) in the manner described above. For the basic sigma-delta modulator implementation shown in FIG. 4, one such controller would be required for each phase of a poly-phase inverter, with corresponding reference waveform inputs for each phase modulator.

Variations on the basic sigma-delta modulator implementation shown in FIG. 2 have been made. Other modulator topologies have also been proposed for resonant DC link converters. However, prior art modulators typically exhibit two shortcomings. First, the spectral performance, or signal-to-noise ratio of the output voltage signal, is not competitive with the industry standards for non-resonant link converters using standard PWM modulation schemes. Secondly, prior art modulators are not directly amenable to more complex power conversion circuits such as poly-phase, multi-level, and matrix converters.

In communications, interpolative sigma-delta modulators are practical for high rate analogue-to-digital conversion and data compression because of their simplicity and robustness against circuit imperfections. They operate by coarsely quantizing the input signal at a sampling rate much higher than the Nyquist rate. Using a combination of feedback and integration, the resulting modulation noise is pushed to higher frequencies, where it may be removed by filtering.

Over the past decade numerous advances in oversampled interpolative modulators of the type just described have appeared in the communications literature. The communications applications are, however, different in several respects to applications in power electronics. First, the modulators employed in communications are usually one-dimensional with a simple quantization scheme (single-bit quantizer) whereas in power electronics applications modulators are required to be multi-dimensional with a rather complex quantization scheme. To improve modulator performance in communications applications, the number of quantization levels may be increased via a multi-bit quantizer. This is not a feasible alternative in power electronics applications because the structure of the quantizer is constrained by the design of the power electronic circuit itself. A second point is that significant clock jitter (nonuniform sampling) is present in applications such as the resonant DC link which is not present in communications applications. Hence, modulators for power electronics applications must be capable of providing the required performance in the presence of clock jitter. Finally, the dynamic range in power electronics applications is a critical design constraint, whereas in communications it is not as important. This requires the use of bridging strategies wherein more complex modulators are degraded into simpler ones according to the required dynamic range.

SUMMARY OF THE INVENTION

In accordance with the present invention, a modulator for resonant DC link converters and other power converter systems is provided having superior spectral performance and general applicability to multi-phase converters. The modulator of the present invention includes three major components: (1) a multi-input, multi-output linear system, (2) a quantizer, and (3) a latch. The linear system receives multiple reference waveforms and multiple waveforms representative of the modulator and inverter output as inputs, and produces multiple linear system signals as outputs which are based on the difference between the reference and output waveforms. The linear system is preferably a second order or higher system. A second order system is capable of providing a performance improvement in the tradeoff between signal-to-noise ratio (SNR) and oversampling ratio (OSR) over first order systems such as the sigma-delta controller shown in FIG. 2.

The quantizer of the present invention assigns, or maps, based upon a rule, the continuous outputs of the linear system to one of a finite set of output vectors. The output vectors are in the form of digital control signals which correspond to switching states of the inverter switching devices. The rule by which the quantizer operates is equivalent to a partition which divides the underlying space, representative of all possible continuous outputs of the linear system, into parts and allots each part to one of the output vectors, representative of the available discrete switching states. Thus, the quantizer takes the multiple continuous outputs of the linear system and combines them to produce a single multi-bit digital output switching state control signal. The available switching states are determined by the design of the inverter circuit. The quantizer may map the outputs of the linear system to all, or a subset, of the available states. A subset of available states is used to simplify the quantizer circuit design at the expense of SNR quality.

The output of the quantizer is latched at a sampling rate determined by the frequency of the DC resonant link. The outputs of the latch are the control signals which are provided to the gating circuits which drive the inverter switching devices. The use of the latch allows the switching devices to change states only at times of zero voltage or current on the DC bus line. The outputs of the latch are also used to derive feedback signals which are provided as inputs to the linear system. These may be the sensed inverter output signals or may be derived using a feedback derivation circuit. In the linear system the feedback signals are compared to the reference waveform inputs to provide the output signals of the linear system which will in turn lead to the generation of new control signals which will drive the average value of the modulator or inverter output to that of the reference waveforms.

A modulator topology in accordance with the present invention is presented for the control of a three-phase resonant DC link inverter. The three-phase modulator includes a second order linear system having two reference waveforms and two waveforms representative of the modulator and inverter outputs as inputs, and providing two linear system signals as outputs. The quantizer of the three-phase modulator maps the linear system signals to six or seven switching states represented by a three bit digital signal. The quantizer circuit requires significantly fewer parts for mappings to six output states, however, mapping to seven states results in an improvement in SNR at the inverter outputs.

The digital quantizer outputs are latched as control signals each time the DC bus is at zero volts. The latch output control signals may be decoded, if necessary, and provided to gating circuits to drive the inverter switching devices. The use of the latch prevents switching of the switching devices at times other than when the DC bus is at zero volts. The latch outputs are also fed back as inputs to the linear system. Since the outputs of the latch double as both control signals and feedback signals, a feedback derivation circuit may be required to derive the feedback signals from the control signals. Otherwise, the feedback signals may be derived from the sensed inverter outputs.

The modulator of the present invention may be provided as part of a control system for controlling the switching of the resonant link and inverter switching devices of a resonant DC link inverter. The invention may be applied to resonant link inverters wherein inverter switching is accomplished at either zero voltage or zero current on the DC bus. The present invention may also be applied to matrix converters, multi-level converters, multi-phase converters and soft-switching converters in general.

Further objects, features and advantages of the invention will be apparent from the following detailed description when taken in conjunction with the accompanying drawings.

DETAILED DESCRIPTION OF THE INVENTION

Figure 1:
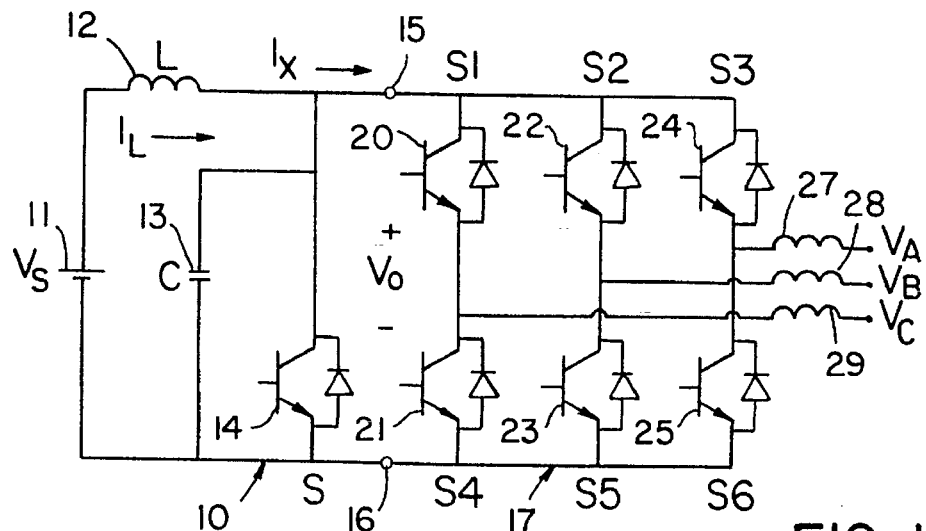
FIG. 1 is a schematic circuit diagram of a three-phase resonant DC link inverter known in the prior art.

Converters, such as the resonant link converter shown in FIG. 1, can be thought of as analog-to-digital converters in which an analog reference is reproduced or modulated by discrete switching states. Moreover, the increased switching frequency capability of these types of converters corresponds to a high degree of oversampling in analog-to-digital converters. Therefore, interpolative modulation techniques are pertinent to improving system performance in electronic power converters. Application of interpolative modulation techniques to electronic power conversion results in substantial improvement in spectral performance over previous modulation techniques.

Figure 5:
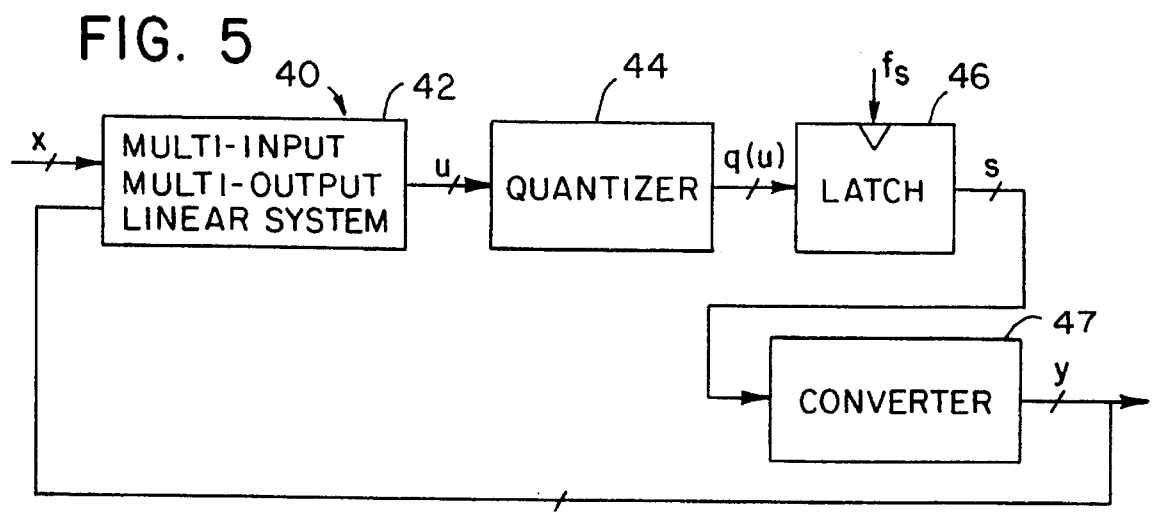
FIG. 5 is a block diagram of the modulator of the present invention.

A block diagram of the modulator of the present invention is shown generally at 40 in FIG. 5. The principal components of the modulator 40 are: a multi-input, multi-output linear system 42, a quantizer 44, and a latch 46. The latch is sampled at a frequency $f_s$ such that, for example, the latch outputs s are allowed to change only when the DC bus of an inverter is at zero volts. The linear system 42 has as inputs multiple reference waveform signals x, and the multiple output waveform signals y of a converter 47. The linear system 42 compares reference inputs x with converter outputs y to produce a linear system state represented by multiple waveforms u, which are functions of the difference or error between the reference waveform signals x and converter output waveform signals y. The linear system state waveforms u are fed to the quantizer 44 which maps the continuous signals to a limited number of discrete switching state signals q(u) which are latched by the latch 46 when the DC bus is at zero volts. The quantizer 44 output signal q(u) is preferably a multi-bit digital signal. The latched digital values s may be provided to decoding and drive circuits for driving the switching devices of a DC resonant link inverter. The reference inputs x, system state signals u, quantizer outputs q(u), latch outputs s and converter outputs y are vectors with dimensions appropriate for the particular modulator application. For example, the reference inputs x can be reference voltage, current, or flux signals.

Figure 6:
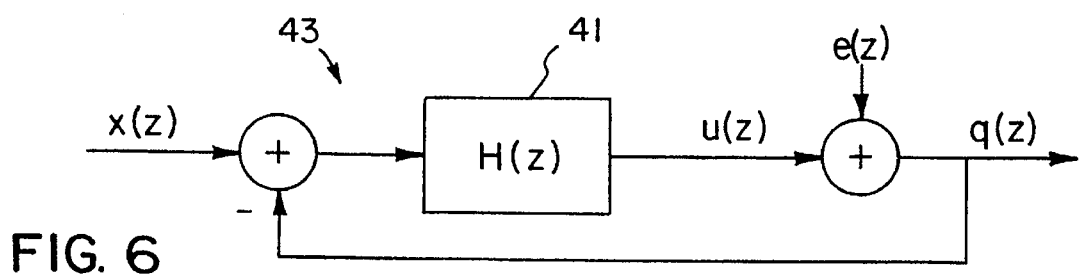
FIG. 6 is a block diagram of the discrete time equivalent of the modulator shown in FIG. 5.
Figure 7:
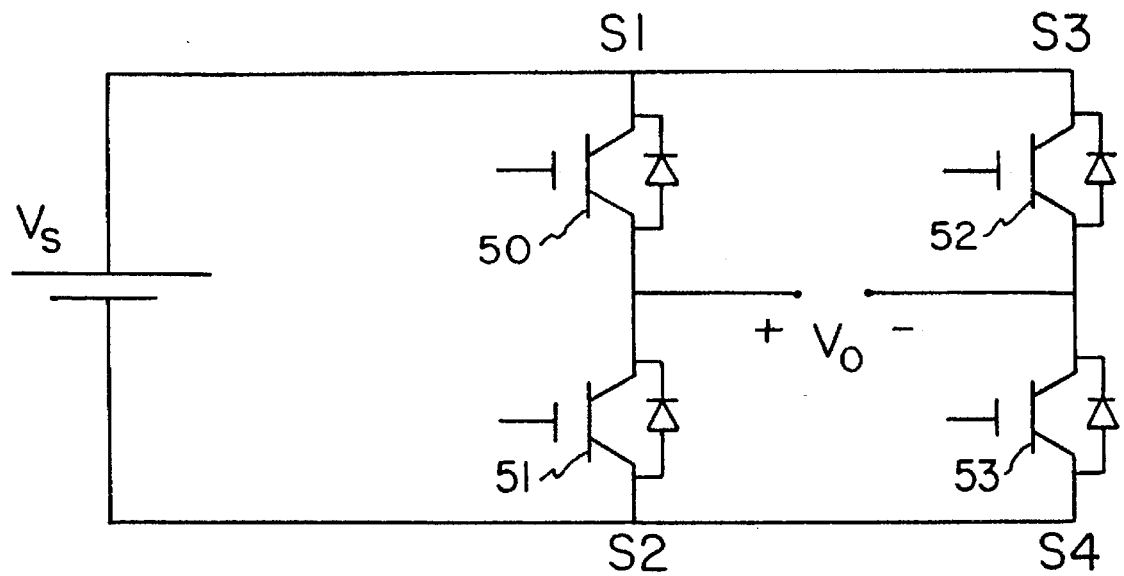
FIG. 7 is a schematic circuit diagram of a single phase inverter.
Figure 8:
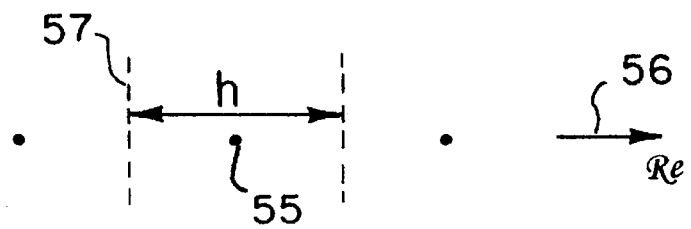
FIG. 8 is an illustration of the partitioning of output vectors for the single-phase inverter of FIG. 7.

A discrete time model of the interpolative modulator of the present invention 43 is shown in FIG. 6, where the multi-input, multi-output linear system is represented by the linear discrete time filter 41 having a transfer function H(z) and where the quantizer is represented by the additive noise source e(z). A common approximation used for the design of modulators is that the quantization noise e(z) is a white, uniform noise source which is statistically uncorrelated with the input. This assumption can often be justified if the input signal or the modulator is sufficiently complex to decorrelate the noise source from the input signal. However, for DC inputs to simple modulators, the quantization noise spectrum consists of discrete spikes whose amplitudes and frequencies are correlated with the input signal. Nevertheless, the practical design of modulators for A/D conversion often use the quantization noise approximation. Similar considerations apply to the vector modulator 43 of the present invention. It is assumed, for purposes of design, that the vector quantization noise e(z) is a white, uniform noise source which is statistically uncorrelated with the input. This assumption greatly simplifies analysis since the resulting system is linear, and conventional linear system techniques may be applied to deduce aspects of the modulator behavior and performance.

Using the approximations described, the output of the modulator 43 shown in FIG. 6 may be written as the sum:

$$q(z) = \frac{H(z)}{1 + H(z)} x(z) + \frac{1}{1 + H(z)} e(z) \quad (5)$$

where:

H(z) is a linear discrete time filter transfer function; and e(z) is the quantization noise as defined in Equation 3. Equation 5 is a fundamental relation describing the interpolative modulator of the present invention. It states that the output of the modulator depends on two terms: the reference input signals x, modified by the transfer function:

$$\frac{H(z)}{1 + H(z)} \quad (6)$$

and the quantizer error e, modified by the transfer function:

$$\frac{1}{1 + H(z)} \quad (7)$$

There are two points of interest concerning the modulator of the present invention. First, as the sampling rate $f_s$, or latching rate of the latch 46, increases, the error transfer function (Equation 7) will be attenuated in the band of interest. Thus, the effect of the error e on the converter output y is reduced. This is because increasing the sampling rate $f_s$ increases the rate at which new converter output values y are fed back through the linear system 42 to correct the quantization error e. At an infinite sampling rate, the quantization error e would theoretically be eliminated by the feedback loop. Because of its effect on the quantization error noise e as seen at the output y, this type of modulator may be referred to as a "noise shaping coder".

The frequency band $0 \leq f < f_0$ is called the baseband; it includes the frequency of the input signal and the band over which it is desirable to reduce noise in the output. The baseband can be chosen according to the load characteristics. When the modulator is sampling much faster than the Nyquist rate $2f_0$ (i.e., oversampling), the quantization noise in the baseband will be greatly attenuated, and the bulk of the noise power will be concentrated above the baseband. That is, the quantization noise will be pushed or shaped to higher frequencies. This shaping of the noise is advantageous since the high frequency noise can be removed by a low pass filter. In power electronics applications, the low pass filter may take several forms, such as leakage inductance in machines and transformers or filters in uninterruptible power supplies (UPS).

The second point of interest concerns the transfer function H. H can be designed so that the noise transfer function (Equation 7) is small in the baseband and the signal transfer function (Equation 6) is unity in the baseband. Thus, the dependence of the modulator output y on the reference signal x rather than the error e, can be made large. In this manner, the signal to noise ratio in the baseband can be made large. For the multi-input, multi-output modulator of the present invention 43, the transfer function H is expressed as a matrix of transfer functions. For the single transfer function value $H=z^{-1}/(1-z^{-1})$, Equation 5 reduces to Equation 4, describing the simple sigma-delta modulator of FIGS. 2 and 3 having a single linear system output, quantizer output, and latch output, and two linear system inputs, a single reference waveform, and the single output of the modulator. Thus, the sigma-delta modulator may be considered a special case simplified form of the modulator of the present invention.

Figure 2:
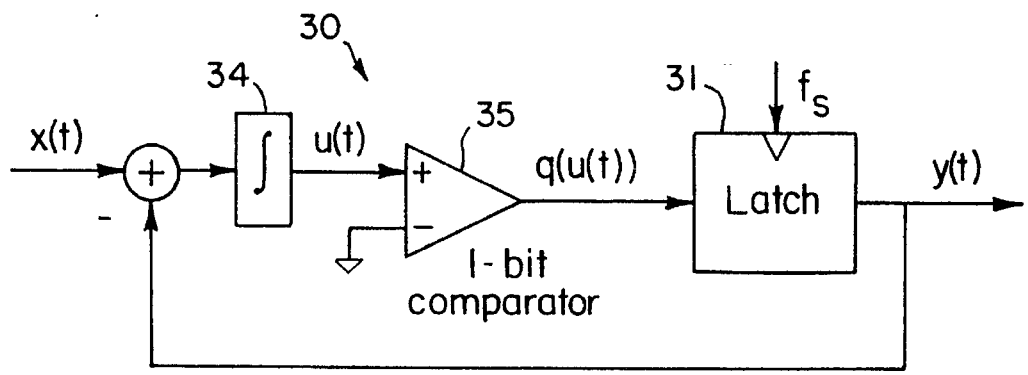
FIG. 2 is a block diagram of a sigma-delta modulator known in the prior art.

The modulator performance, which can be measured by the signal-to-noise ratio (SNR) over the baseband, is mainly governed by the "order" of the modulator and the oversampling ratio (OSR), which is the ratio of the sampling frequency to the Nyquist rate $2f_0$. Order refers to the order of the filter H. For instance, the sigma-delta modulator of FIG. 2 is first-order. As in conventional filter designs, a higher SNR requires a higher order filter and thus increased hardware complexity. However, the advantage of choosing a higher order filter is improved SNR for a given OSR. Thus, for the modulator 43 of the present invention, a second order or higher linear system 42 is preferred. A main limitation of modulators of higher order (greater than 2) is potential stability problems in which large-amplitude, low-frequency oscillations can appear. These oscillations can drive the modulator into sustained modes of integrator saturation.

The operation of the quantizer 44 of the modulator 40 is explained with reference to FIGS. 7–10. The output of a power electronic circuit is representable by a finite set of output vectors. Each output vector corresponds to a particular switching state of the circuit. For instance, the single phase voltage source inverter shown in FIG. 7 has four switching devices 50, 51, 52, and 53, and four possible switching states. The four switching devices 50–53 may be referred to as S1, S2, S3, and S4, respectively. The four possible switching states, and resulting instantaneous output voltages across the inverter bridge, $V_o$, with respect to the input voltage $V_s$, are shown in Table 1.

TABLE 1

| Switching States of Single Phase Inverter | | | | |
|---|---|---|---|---|
| S1 | S2 | S3 | S4 | $V_o$ |
| ON | OFF | OFF | ON | $+V_s$ |
| OFF | ON | ON | OFF | $-V_s$ |
| ON | OFF | ON | OFF | 0 |
| OFF | ON | OFF | ON | 0 |

The last two switching states are equivalent, resulting in the same output value. Therefore, the switching states correspond to only three distinct output vectors shown as dots 55 in FIG. 8.

Similarly, the three-phase voltage source inverter shown in FIG. 1 has eight possible switching states. These switching states are shown in Table 2.

TABLE 2

| Switching States of Three Phase Inverter | | | | | | |
|---|---|---|---|---|---|---|
| State | S1 | S2 | S3 | S4 | S5 | S6 |
| 1 | ON | OFF | OFF | OFF | ON | ON |
| 2 | ON | ON | OFF | OFF | OFF | ON |
| 3 | OFF | ON | OFF | ON | OFF | ON |
| 4 | OFF | ON | ON | ON | OFF | OFF |
| 5 | OFF | OFF | ON | ON | ON | OFF |
| 6 | ON | OFF | ON | OFF | ON | OFF |
| 7 | ON | ON | ON | OFF | OFF | OFF |
| 7 | OFF | OFF | OFF | ON | ON | ON |

Figure 9:
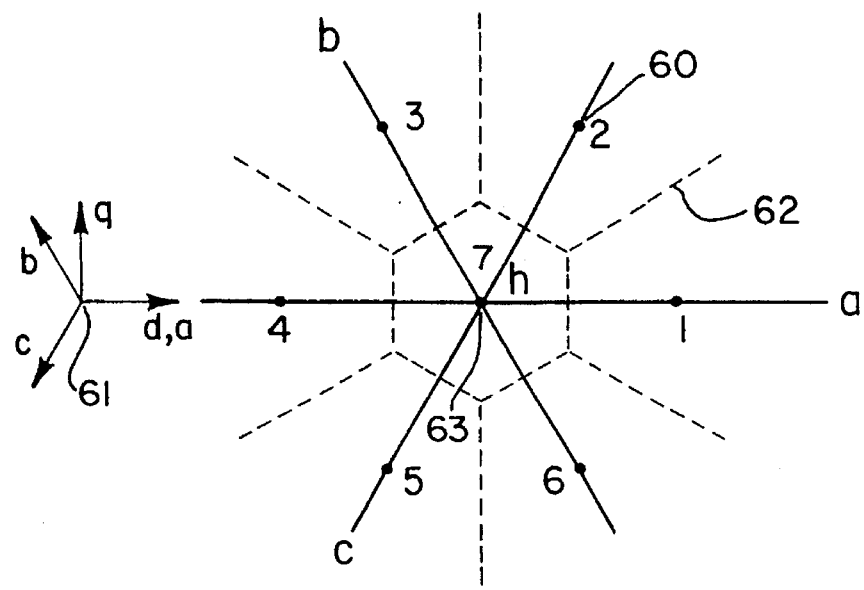
FIG. 9 is an illustration of the mapping of continuous input signals to seven discrete switching state output vectors for a three-phase resonant DC link inverter.

Since the last two switching states are equivalent, resulting in the same line to neutral voltages, the eight switching states correspond to only seven distinct output vectors shown as dots 60 in FIG. 9 and labeled as switching states 1–7. Notice that in the single phase case, FIG. 8, the output vectors lie on a line, and in the three-phase case, FIG. 9, the output vectors lie in a plane. Other circuits, such as matrix converters, multi-level converters, and multi-phase converters have similar representations. Having introduced the representation of the output of a circuit by output vectors, the relationship between the output vectors 55 and 60 and the quantizer 44 may be described.

The quantizer 44 is a device which assigns, or maps, based upon a rule, any continuous input signal or signals to one of the finite set of output vectors. Thus, the quantizer 44 of FIG. 5 assigns the continuous linear system signals to one of the output vectors q(u), which is a digital signal having a limited number of discrete vector values. The rule by which the mapping is accomplished is equivalent to a partition which divides an underlying space representative of the input vectors into parts and allots each part to one of the output vectors. For example, the single-phase quantizer of FIG. 8 maps a linear state vector, represented by the line 56, to one of the three output vectors 55 shown as dots. The broken lines 57 delimit the segments of the line 56 which are is assigned to each dot. Similarly, the vector quantizer of FIG. 9 assigns a vector in the plane 61, representative of an infinite number of possible input vectors, to one of seven output vectors indicated by the dots 60. The broken lines 62 delimit the regions in the plane associated with each output vector. Thus, the preferred quantizer maps a continuous input vector u to the dot nearest to u. This "hexagonal" vector quantizer is a nearest neighbor quantizer and is optimal in the sense that the mean square error from input to output is minimized. Other mapping schemes may also be used.

Figure 10:
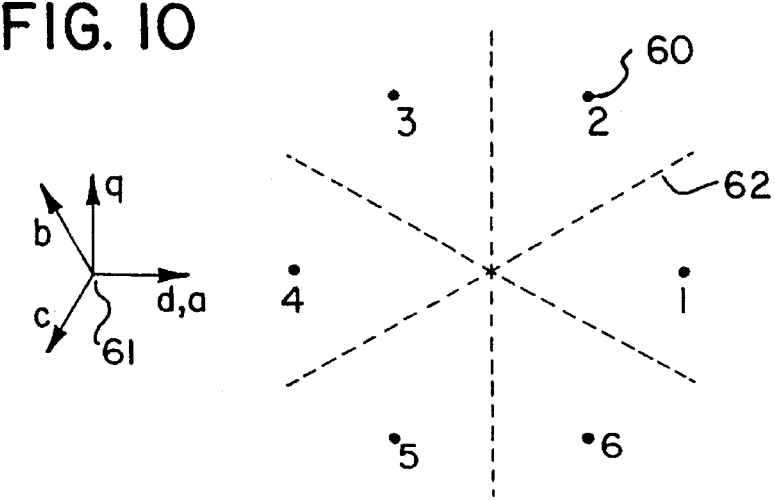
FIG. 10 is an illustration of the mapping of continuous input signals to six discrete switching state output vectors for a three-phase resonant DC link inverter.

The structure of the quantizer 44 is dependent on the circuit and the partition. The circuit defines the underlying space and its set of output vectors, while the partition defines the relationship between the system state and the set of output vectors. Thus, given a circuit, a designer of the quantizer may only choose the partition. This choice has a strong effect on the performance of the modulator 40. For instance, the parameter h in FIG. 8 determines the length of the line segment which is mapped to the center output vector 55. Likewise, the parameter h in FIG. 9 delimits the area of the inner hexagonal region which will be assigned to output vector 63. By decreasing h to zero in FIG. 9, the structure of the vector quantizer becomes that shown in FIG. 10. Accordingly, the center output vector 63 is eliminated, and the implementation of the quantizer becomes simpler. However, the SNR of a three phase resonant DC link inverter employing a quantizer structure as shown in FIG. 10 will not be as good as a similar inverter employing the quantizer structure of FIG. 9.

The quantizer 44 combines all of the linear system signals u to derive the single switching state signal q(u). Thus, if q(u) is a multi-bit digital signal, at least one of the bits will depend on a combination of the linear system signals rather than on each signal independently. As a result, the modulator 40 of the present invention provides a single unified switching control signal rather than separate control signals for each phase which are independently derived by, for example, multiple independent sigma-delta controllers in parallel.

The function of the latch 46 of the modulator 40 in FIG. 5 is to sample the quantizer output vector q(u), at rate $f_s$, and hold that vector until the next sampling instant. For a resonant DC link inverter 47 the sampling rate $f_s$ is such that the output s is latched only at times of zero voltage on the DC bus. The latch output s is used for two purposes. First, s is fed back to the linear system 42 through the converter output y. In addition, the latch output defines the switch state of the circuit. Thus, s also acts as a control signal which may be provided to decoding and gate drive circuits for driving the inverter switching elements.

As has been already mentioned, the modulator of the present invention may be applied to various complex circuit structures, such as poly-phase, multi-level and matrix converters. A preferred and exemplary application of the modulator of the present invention is as a modulator designed for switching control of a three-phase resonant DC link converter of the type generally shown in FIG. 1. The preferred modulator structure is shown generally at 70 in the block diagram of FIG. 11. The preferred modulator 70 includes a multi-input, multi-output linear system 42 implements a linear transfer function H(z). The modulator 70 also includes a vector quantizer 74 which maps the output signals u of the linear system 42 to a digital switching state vector signal. The vector quantizer 74 may map to either six or seven switching states. The circuit implementation of a vector quantizer 74 which maps to six states will be simpler and contain fewer parts, however, it will not provide as good an SNR as a vector quantizer which maps to seven switching states.

The switching state signal outputs of the vector quantizer 74 are latched by the latch 76 at a frequency $f_s$ such that the latch outputs change to reflect the latch inputs only at times when the DC bus of the resonant link inverter is at zero volts. The outputs of the latch are, therefore, control signals which may be fed to decoding and drive circuits for driving the inverter switches 20–25 of the resonant DC link 77. The switching state signals determine the instantaneous output signals of the inverter 77. The output signals are fed back to the linear system 42.

The reference inputs, $x_a$ and $x_b$, can be voltage, current, or flux waveforms. Note that the modulator 70 may be implemented in either a-b-c or d-q coordinates. In other words, the reference inputs, for example, might refer to desired voltage waveforms on output lines 27, 28, or 29 of the inverter 17 with respect to a neutral line (three a-b-c coordinates which sum to zero), or may refer to desired voltage waveforms between the output lines, such as $V_{A-B}$ and $V_{A-C}$ (two d-q coordinates).

The linear system 42 is preferably designed using the noise shaping techniques described above. The design consists of choosing filter transfer function H which will satisfy given spectral performance criteria, such as given OSR and input bandwidth, as well as ensure stability. These design considerations readily generalize to vector modulators. For the vector modulator, the filter H(z) has a vector input and output. Two possible choices for H of use with the hexagonal quantizer are:

$$H_1 = \frac{z^{-1}}{1-Z^{-1}} I \qquad (8)$$

$$H_2 = \frac{z^{-1}(z^{-1}-2)}{1-2z^{-1}+z^{-2}} I$$

where I is an identity matrix of appropriate dimensions.

Figure 3:
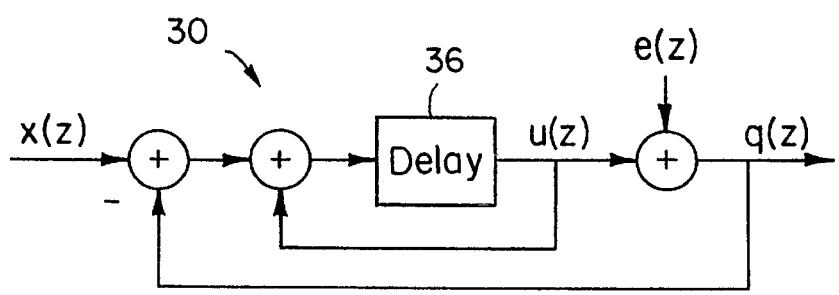
FIG. 3 is a block diagram of the discrete-time equivalent of the sigma-delta modulator shown in FIG. 2.
Figure 4:
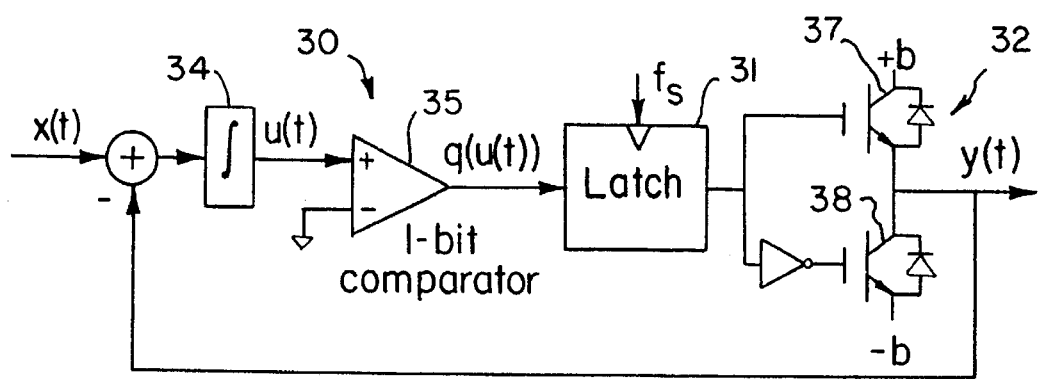
FIG. 4 is a block diagram of a sigma-delta modulator as shown in FIG. 2 for a half-bridge inverter.

The transfer function $H_1$ defines a first order system having performance similar to the sigma-delta modulator of FIGS. 2 and 3. The second order system, with transfer function $H_2$, is superior to the first order modulator because it only requires a moderate increase in circuit complexity and yet it achieves a 15 dB/octave tradeoff between SNR and OSR, whereas the first order modulator achieves only 9 dB/octave. Furthermore, both modulators have the same stable input range (dynamic range). The second order system is preferable. The vector quantizer 74 may take the structure of FIG. 9, mapping to seven switching states, or FIG. 10, mapping to six switching states, depending on the opposing requirements of performance and implementation simplicity.

The noise shaping filter H(z) is usually designed in discrete time. However, modulators for power electronic applications have been implemented in continuous-time with op-amps, comparators, and latches. A discrete-time modulator can be converted to an equivalent continuous-time modulator using an impulse invariant transformation. The implementation of a discrete time modulator in continuous time circuit components will, therefore, be well known to those having skill in the relevant art.

An embodiment of the modulator 70 with linear system 42 for use with a three phase resonant DC link inverter is described with reference to FIG. 12. In this embodiment, the multi-input, multi-output linear system 42 is more narrowly defined as two 2-input, 1-output linear systems 71 and 72 implementing the transfer function $H_2$ described above. The vector quantizer 74 maps the output signals $u_{a-b}$ of the linear systems 71 and 72 to a three-bit digital switching state signal $q_{a-c}$. As described above, the vector quantizer 74 may map to either six or seven switching states. The three-bit switching state signal outputs $q_{a-c}$ of the vector quantizer 74 are latched by the latch 76 at a frequency $f_s$ such that the latch outputs $S_{a-c}$ change to reflect the latch inputs $q_{a-c}$ only at times when the DC bus of the resonant link inverter is at zero volts. The outputs of the latch $s_{a-c}$ are, therefore, control signals which may be fed to decoding and drive circuits for driving the inverter switches 20–25.

Figure 12:
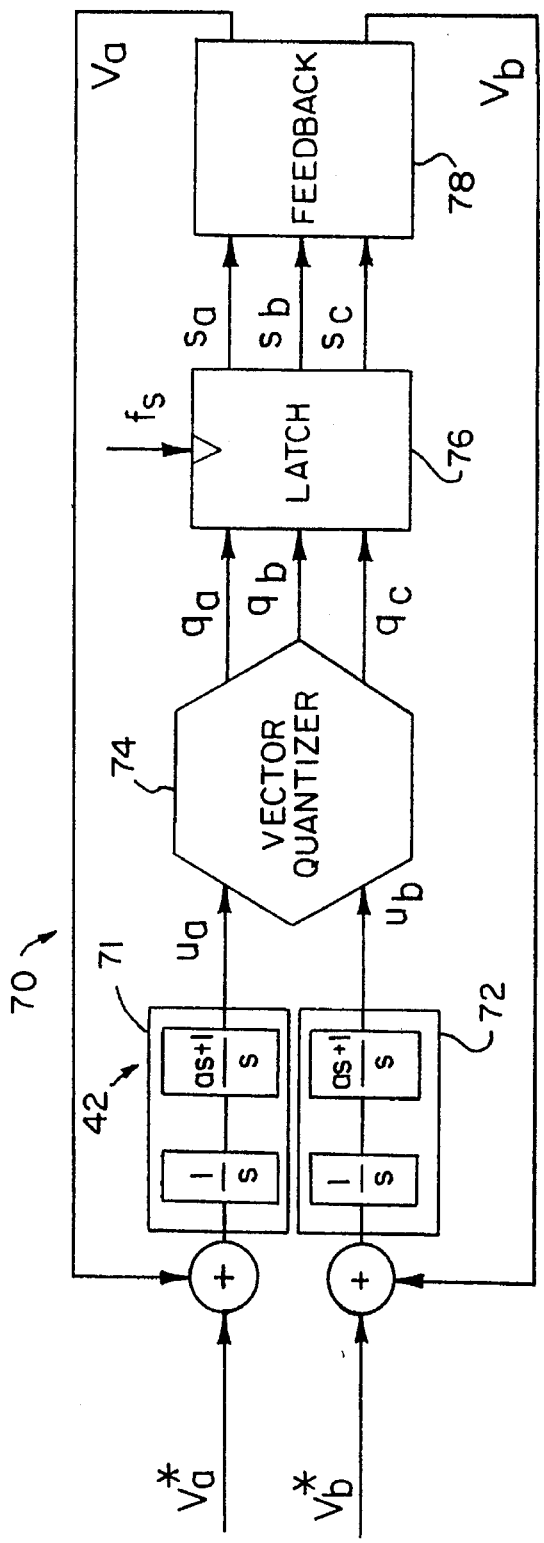
FIG. 12 is a block diagram of a modulator in accordance with the present invention for use in a three phase resonant DC link inverter including a preferred second order linear system.
Figure 13:
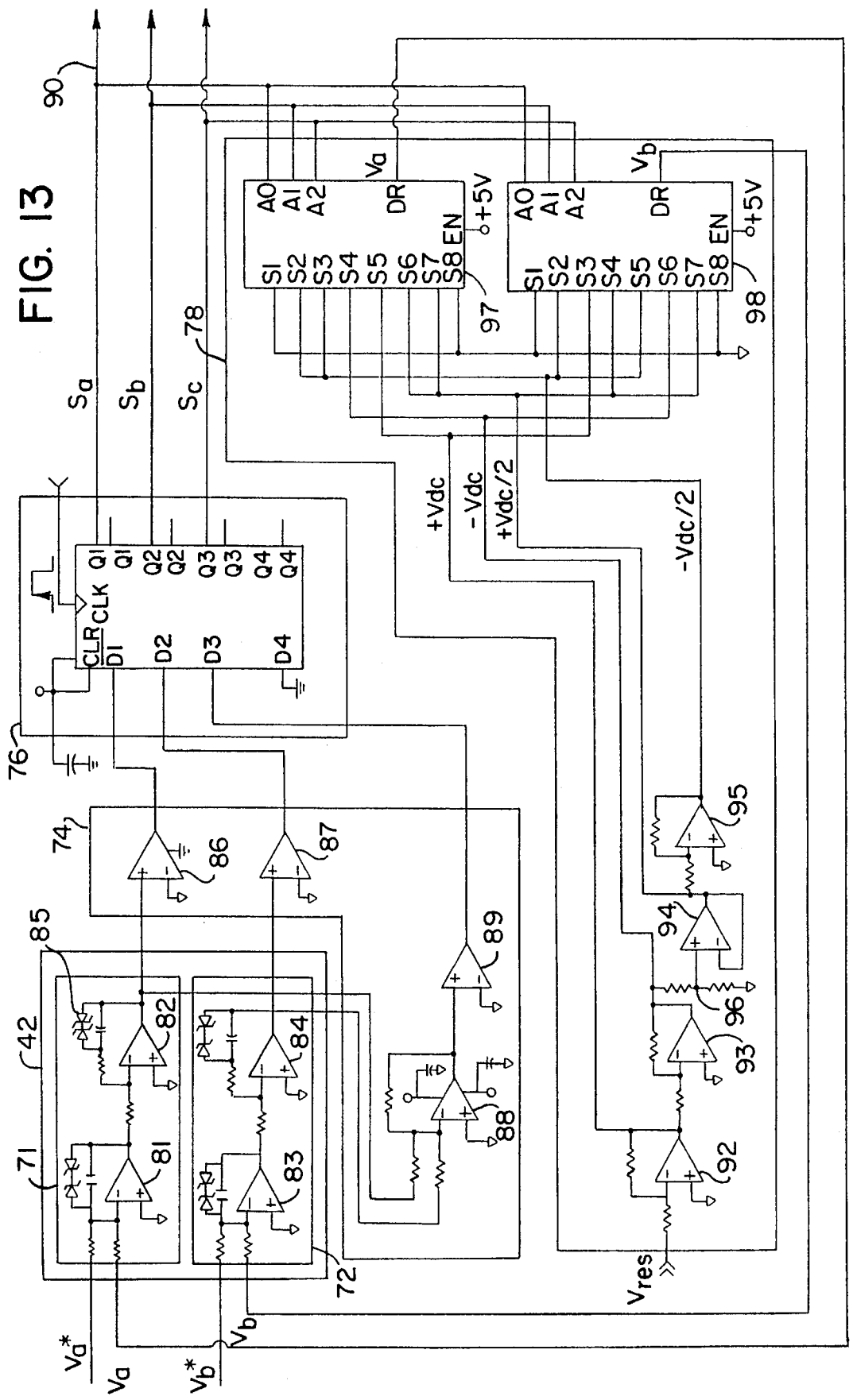
FIG. 13 is a schematic circuit diagram of the modulator of FIG. 12 wherein the quantizer maps linear signals to one of six output switching states, as illustrated in FIG. 10.

A circuit implementation for the modulator of FIG. 12 including a second order linear system 42 with transfer function $H_2$, and the quantization scheme of FIG. 10, mapping to six switching states, is shown in FIG. 13. The second order linear system 42 is implemented as two identical parallel circuits 71 and 72. Each circuit includes an integrating amplifier 81 or 83 connected in series with an amplifier 82 or 84 implementing the function (as+1/s where a typical choice for a is a=1.5/ $f_s$. The outputs of the linear system 42 are thus a second order function of the difference between the reference signal inputs $V_a^*$, $V_b^*$ and waveforms representative of the output of the inverter $V_a$, $V_b$. Tuned filters could be used as well as, or as an alternative to, the integrators to implement a second order linear system. Higher order modulators could also be implemented using this basic circuit structure by adding additional integrators in series. However, increasing the order of the linear system in this manner increases the likelihood that one or more of the integrators will become saturated and that stability problems will result. The stable input signal range (for first or second order modulators) is the hexagon which passes through the outer six output space vectors of FIG. 9. When the input signal exceeds this range, the modulators wind up. However, over modulation causes the input signal to exceed the stable range. To address this problem, clippers 85 may be placed on the integration capacitors. The thresholds of the clippers are selected to be slightly greater than the integrator voltages during stable operation. This stabilization technique ensures that the output voltage waveforms gradually degrade into six-step mode as the input signal is increased beyond the stable input signal range. This technique may also be applied to higher order (greater than 2) interpolative modulators which always have the potential for oscillation when the input exceeds the stable input range. The outputs of the linear system represent the linear state of the modulator and are used to drive the average value of the inverter outputs, represented by $V_a$ and $V_b$ to equal the average value of the reference waveforms $V_a^*$ and $V_b^*$.

The linear signal outputs of the linear system 42 are quantized by the vector quantizer 74 into a three bit digital signal. The quantizer 74 consists basically of three comparators 86, 87, and 89, and an inverting summer 88. It can be seen that the output of the comparator 86 will be HIGH when the output of the linear system 42 from integrator 82 is greater than the reference voltage, which in this case is zero volts (the neutral line voltage). Similarly, the output of comparator 87 will be HIGH when the output of the linear system from integrator 84 is greater than the ground reference voltage. When both outputs of the linear system are above the ground reference, the output of the inverting summer 88 will be below the ground reference of the comparator 89 and the output of the comparator 89 will be LOW. Similarly, if both outputs of the linear system 42 are below the ground reference, the outputs of comparators 86 and 87 will be LOW, the output of the summing inverter 88 will be HIGH, and the output of comparator 89 will be HIGH. Thus, the effect of the inverting summer 88 is to balance the quantization inputs so that the switching state bits can never be all simultaneously HIGH or LOW. From this fact it can be seen that the last switching state shown in Table 2 is the switching state which is eliminated by decreasing h to zero in FIG. 10, thereby reducing the available switching states to six. When the outputs of the linear system 42 have opposite signs, the output of summer 88 is the opposite of that signal from the linear system 42 which has the highest magnitude. Thus, if the output of integrator 82 is significantly positive, and the output of integrator 84 is slightly negative, the output of comparator 86 will be HIGH, the output of comparator 87 will be LOW, the output of summer 88 will be below the ground reference voltage and, therefore, the output of comparator 89 will be LOW. In this way, the output signals from the linear system 42 are mapped onto all but one of the switching states shown in Table 2.

The outputs of the comparators 86, 87 and 89, are latched at the latch 76 at a rate such that the latch outputs are only allowed to change at times when the DC bus of the resonant link is at zero volts. The latch outputs, $S_a$, $S_b$, and $S_c$ may be fed as control signals, on lines 90, to gating circuits which drive the switching devices of the inverter 20–25.

The latch outputs, $S_{a-c}$, are also needed to complete the feedback loop to the linear system 42. However, in the circuit shown, the latch outputs, $S_{a-c}$, are control signal values of either 0 or 5 volts. However, the reference waveforms, $V_a^*$ and $V_b^*$, are on a scale related to the output voltage level of the inverter itself. Rather than swinging from 0 to 5 volts, the voltage waveform on each output line 27–29 of the inverter will vary between the instantaneous voltage levels on each terminal 15, 16 of the DC bus. Therefore, the control signal outputs of the latch 76 must be converted to voltage levels of the same scale as the reference voltage waveforms and the output voltage waveforms of the inverter. The feedback derivation circuit 78 is employed to convert the latch output control signals to waveforms representative of the inverter output which can then be fed back to the linear system 42 for comparison with the reference waveforms.

The feedback derivation circuit 78 includes a series of inverting amplifiers 92, 93, 94, 95, and a voltage divider 96, in series, which are fed by the output voltage signal at one terminal 15 of the resonant link $V_{res}$. The inverting amplifiers 92–95, and the voltage divider 96 provide voltage levels representative of the actual output levels of the inverter. These voltage levels are provided as inputs to the demultiplexers 97 and 98. The output of each of the demultiplexers 97 and 98 is one of these voltage levels representative of the inverter output. These outputs form the waveforms which are fed back to the linear system 42. The voltage value which is selected at any particular time is determined by the control signal outputs, $S_{a-c}$, of the latch 76 which provide addressing signals to the demultiplexers 97 and 98.

Figure 14B:
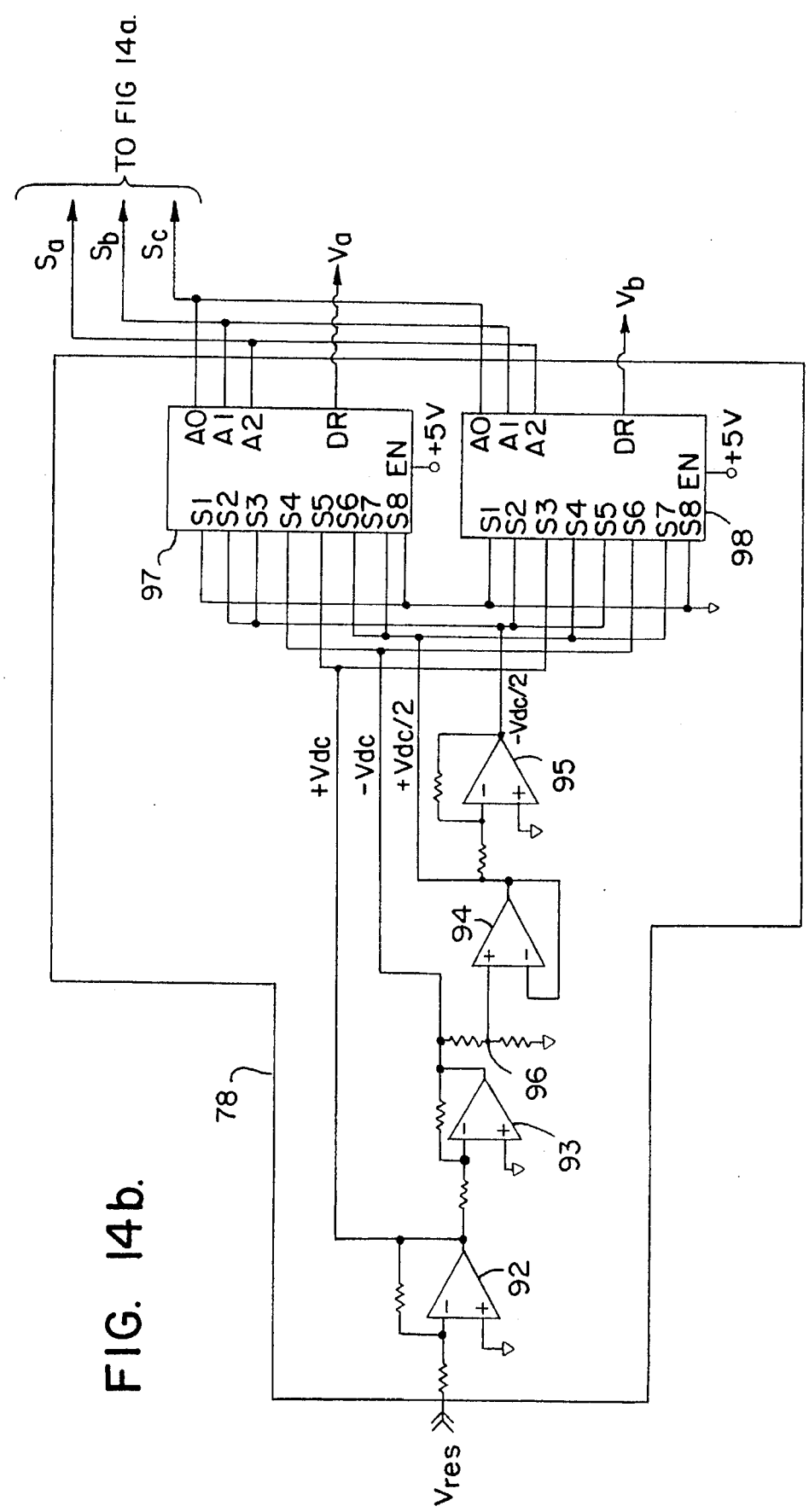
FIG. 14 is a schematic circuit diagram of the modulator of FIG. 12 wherein the quantizer maps linear signals to seven output switching states as illustrated in FIG. 9.

The schematic circuit diagram of FIG. 14 shows an alternative circuit implementation for the modulator having a second order linear system defined by the transfer function $H_2$. This alternative circuit inplements the quantization scheme of FIG. 9. The quantizer 74 of this circuit, therefore, maps the outputs of the two second order linear systems 71 and 72 to one of seven switching states, as shown in Table 2. The modulator of FIG. 14 results in an improvement in inverter output SNR over the circuit implementation shown in FIG. 13. However, as can easily be noticed, the modulator shown in FIG. 14 requires significantly more parts to implement the quantizer 74. The quantizer mapping of this circuit may be briefly described as follows. Three sets of comparators 100, 101 and 102 correspond to the axes a, b, and c as shown in FIG. 9. The three-bit signal produced by each comparator set determines whether the input vector component along each axis will be mapped to the center area h or one of the adjacent areas. Thus, comparator set 100 determines mappings to vectors 1, 4 and 7, set 101 determines mappings to vectors 3, 6 and 7, and set 102 determines mappings to vectors 2, 5 and 7. The NOR gate 104 makes a final determination on whether the input signals will map to the center output vector, since all of the sets 100–102 must determine a mapping to the center vector for this to occur. The summer 106 serves a function similar to summer 88 in FIG. 13, balancing the quantizer inputs. The circuit 108 provides a reference value to the comparators which determines the size of the h region around the center vector. The linear system 42, latch 76, and reference converter circuits 78, of FIG. 14 are identical to those of FIG. 13 and are so designated with the same reference numerals as used in FIG. 13.

Figure 11:
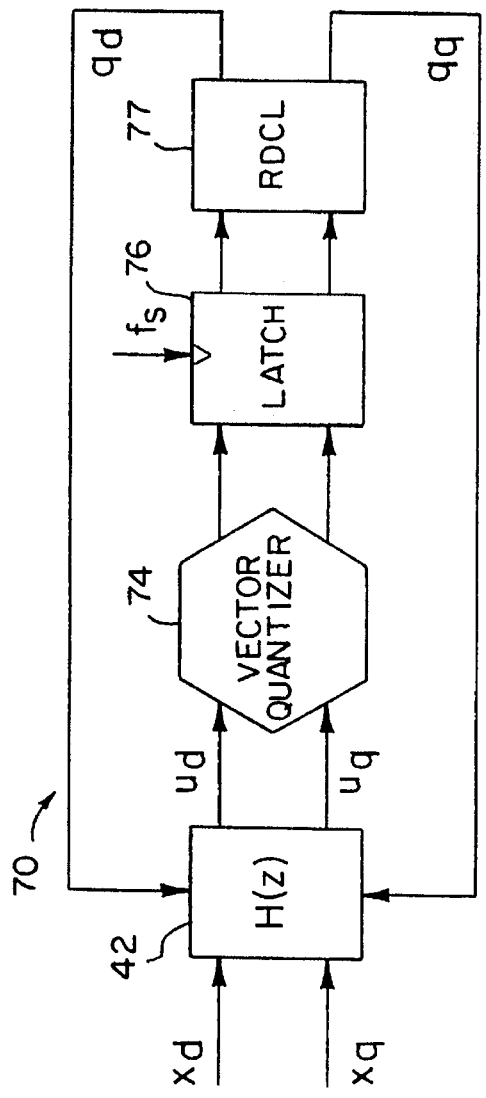
FIG. 11 is a block diagram of a modulator in accordance with the present invention for use in a three-phase resonant DC link inverter.
Figure 15:
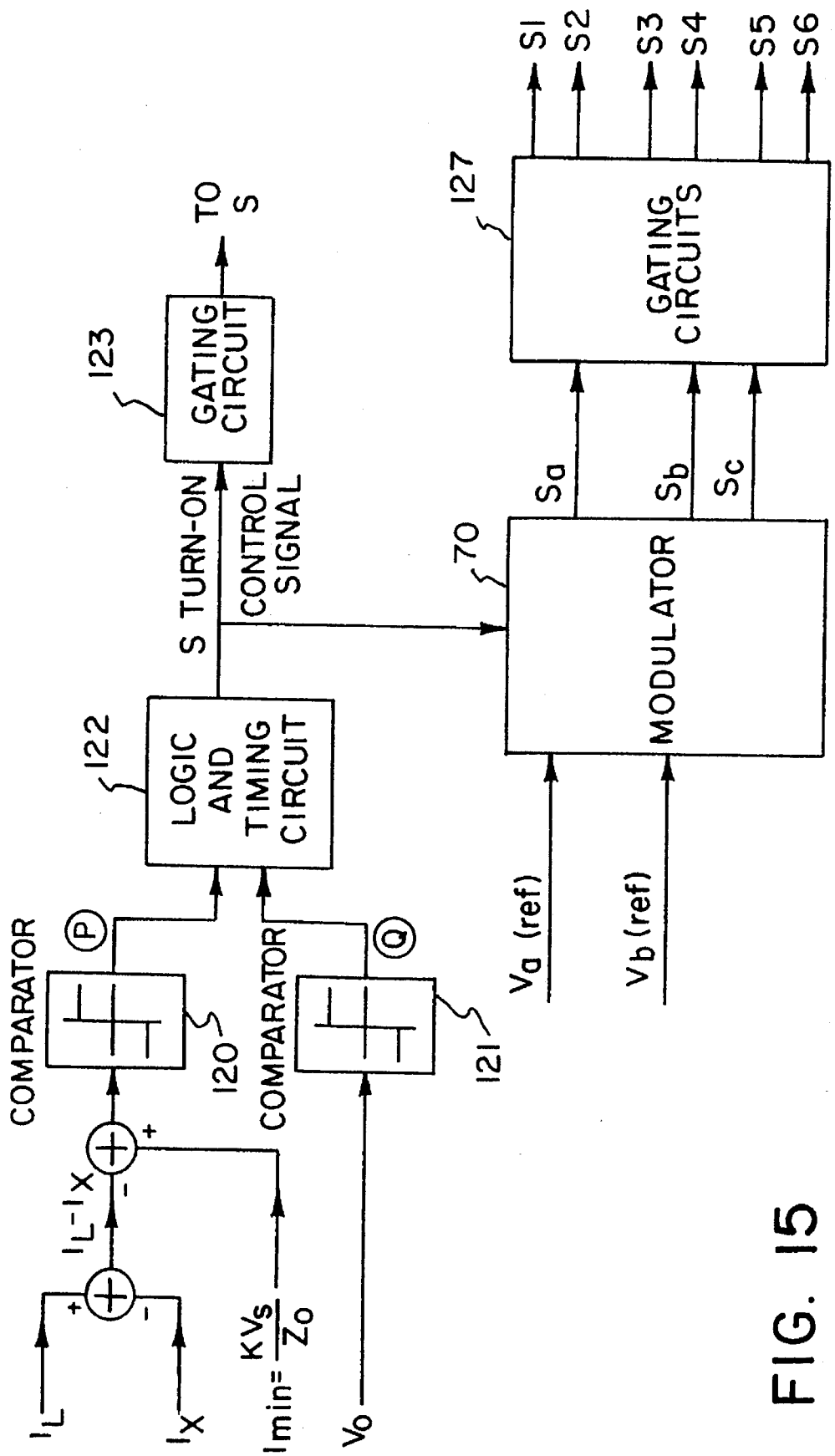
FIG. 15 is a block diagram of a system controller for controlling the oscillation of the resonant circuit and the switching of the switching devices in a three-phase resonant DC link inverter incorporating the modulator of the present invention.

A control system for controlling the resonant DC link inverter of FIG. 1 which incorporates the modulator structure 70 of FIG. 11, is shown in FIG. 15. The inductor current $I_L$ and the load current $I_x$ are subtracted from a calculated minimum current $I_{min}$ required to maintain oscillations on the DC bus lines. The differences are provided to a comparator 120 which switches outputs when the difference is negative. The voltage across the DC bus, $V_o$, is provided to a comparator 121 which switches when the bus voltage reaches zero. The outputs of the comparators 120 and 121 are provided to a logic and timing circuit 122 which uses the signals to provide an output enable or turn-on signal which allows turn-on of the various switches in the inverter system when the conditions from both comparators are satisfied. The turn-on signal from the circuit 122 is provided to a gating circuit 123 which provides the proper gating drive signals to the switch 14 (FIG. 1) so that this switch may be turned on until the comparator 120 changes condition. This then insures excitation of the LC resonant circuit composed of the inductor 12 and capacitor 13 sufficient to maintain oscillation. The inverter switches 20–25 are controlled through the use of either voltage reference (as shown) or current reference signals provided to the modulator system 70 of the present invention. The modulator output signals, $S_{a-c}$, are latched by the synchronization signal from the logic circuit 122 to synchronize changes of the modulator output with the times of zero voltage across the DC bus. The outputs of the modulator 70 are provided to gating circuits 127 which provide proper gating drive signals to the gate inputs of the switching devices 20–25.

Results for first and second order modulators in accordance with the present invention are described with reference to FIGS. 16–19. A regularly sampled 75 kHz hard-switched voltage source inverter (VSI) was simulated, and experimental results for a 40 kVa 75 kHz actively clamped resonant DC link inverter (ACRDCL) with a R-L load are presented. Although a 75 kHz VSI is not practical, its simulation provides a reference point for comparison with the experimental ACRDCL. The results were obtained with the first and second order modulators specified by the nearest neighbor hexagonal quantizer and filters defined in Equation 8. A three-phase balanced sinusoidal input with peak amplitude 0.72 (maximum is 1.0) and frequency 75 Hz was used throughout. A baseband of 5 kHz, which corresponds to an OSR of 7.5, was assumed.

Figure 16:
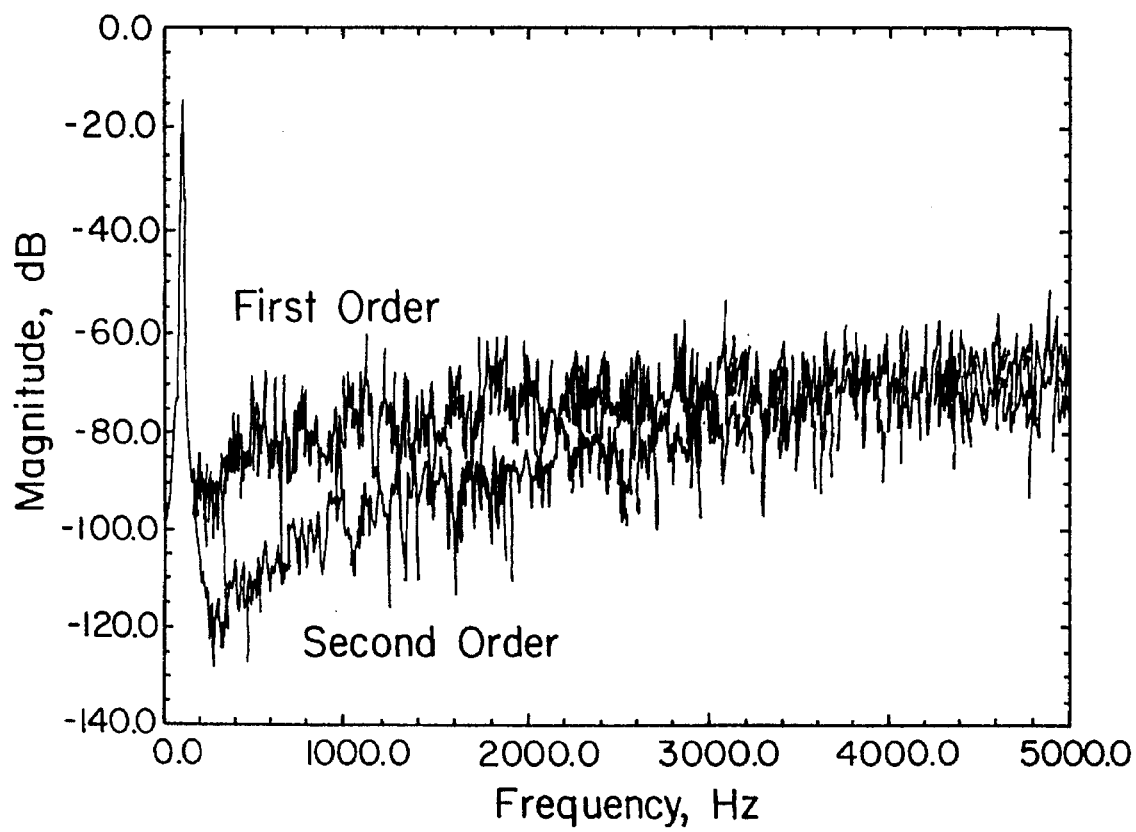
FIG. 16 is a graph of simulated voltage source inverter line-neutral spectra for first and second order modulators.

The spectra of the line—line voltage for the first and second order modulators are shown in FIG. 16 for the simulated VSI. Comparison between the two modulators shows approximately 23 dB of modulation noise improvement up to 1 kHz of the second order over the first order modulator, and the spectra converge at approximately the baseband limit frequency ($f_o$=5 kHz). For simulations, FFTs were performed on over 32,000 data points using a Blackman window. The envelopes of the voltage waveforms for the simulated VSI and the experimental ACRDCL are similar.

Figure 17:
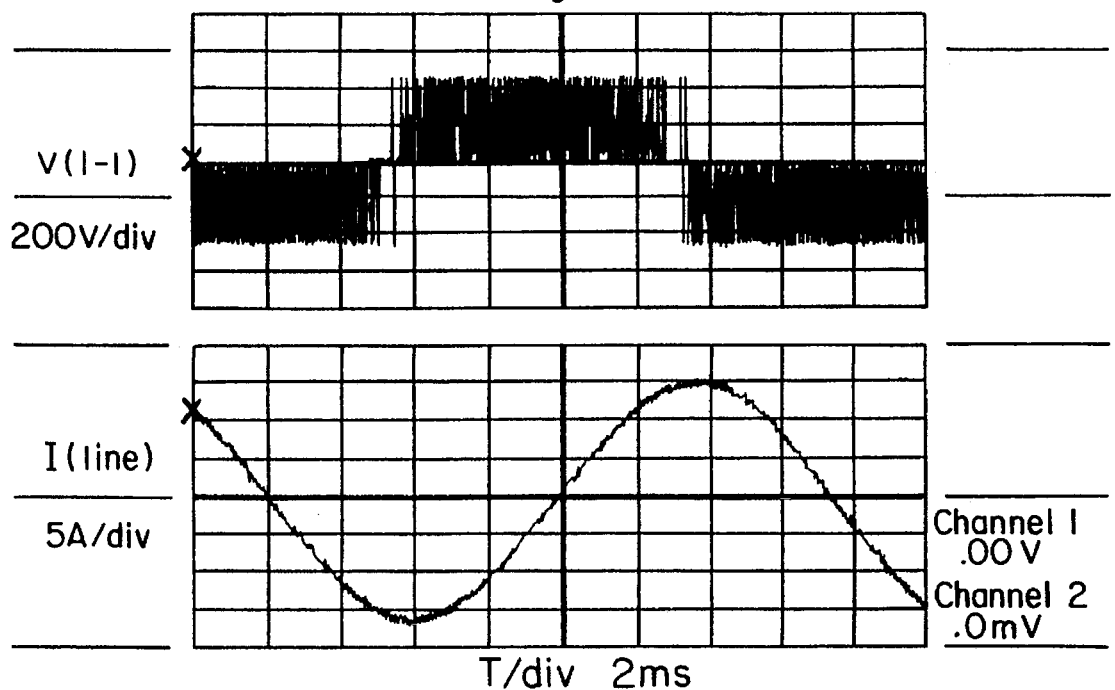
FIG. 17 is a graph of experimental actively clamped resonant DC link inverter line—line voltage and line current for a first order modulator.
Figure 18:
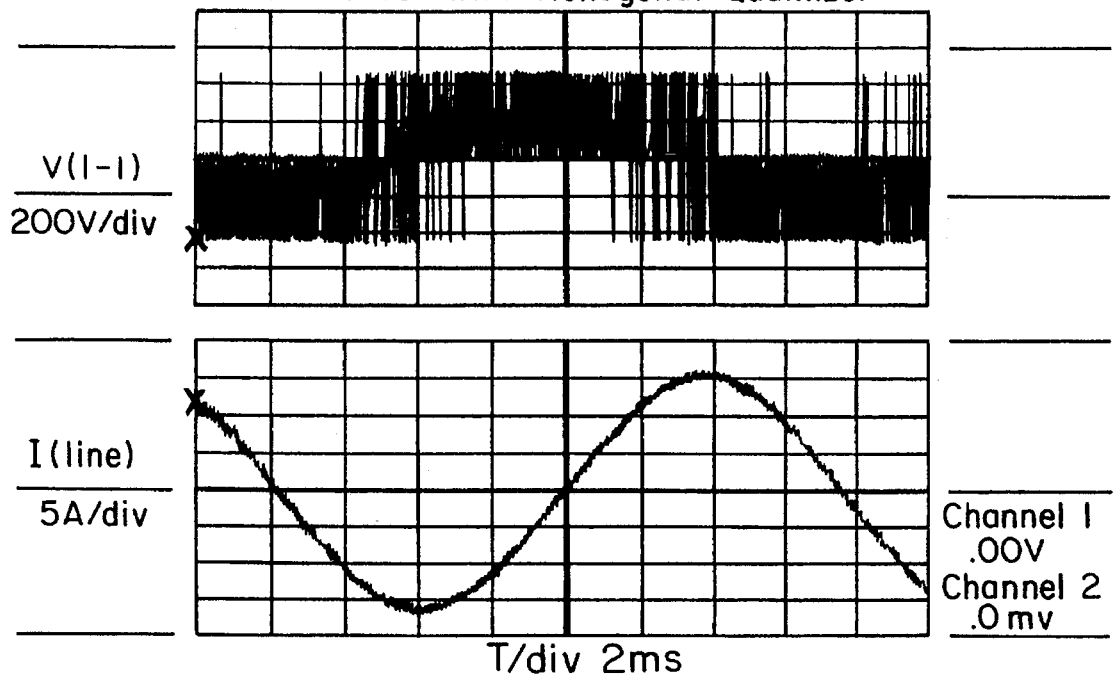
FIG. 18 is a graph of experimental actively clamped resonant DC link inverter line—line voltage and line current for a second order modulator.
Figure 19:
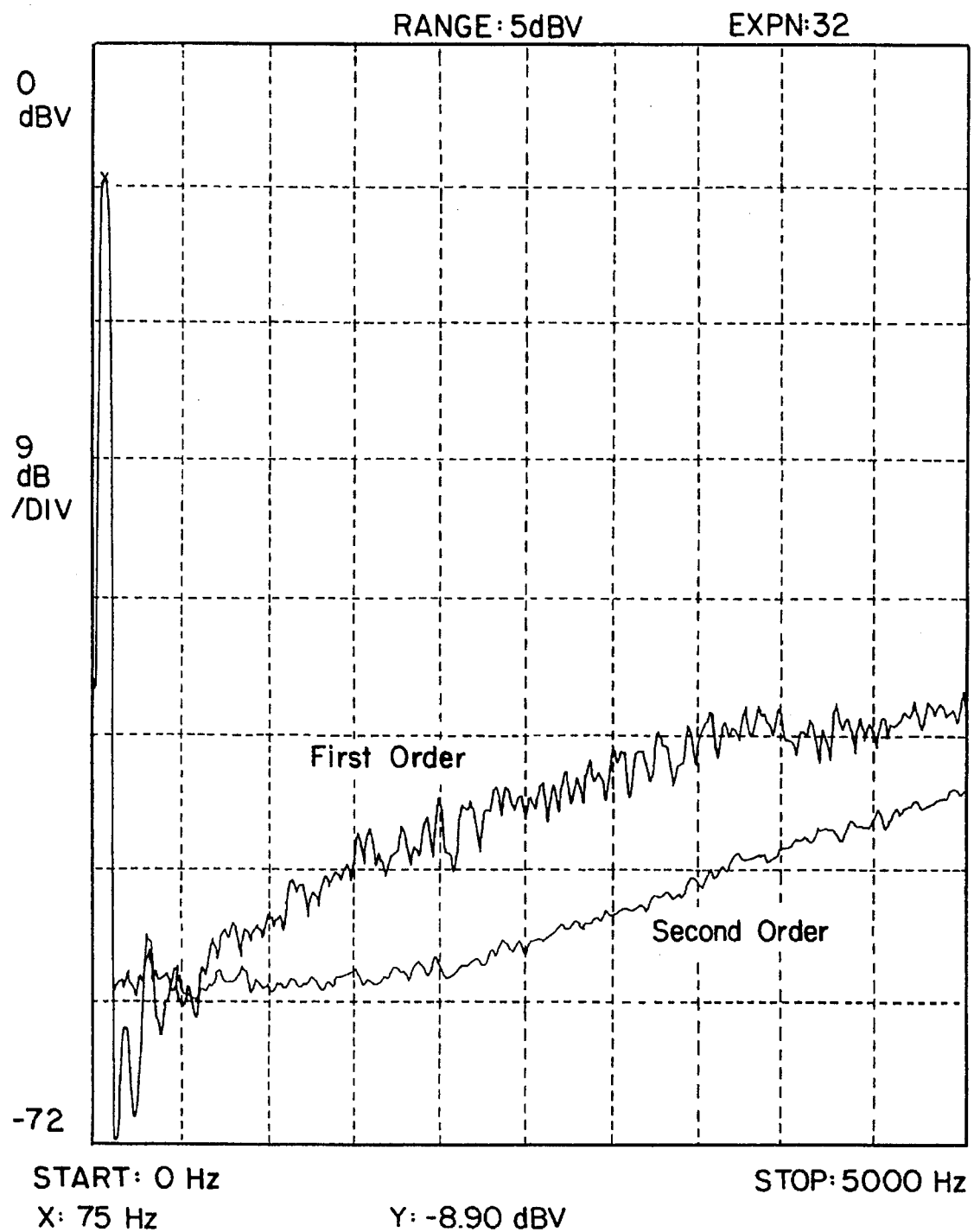
FIG. 19 is a graph of experimental actively clamped resonant DC link inverter line—line voltage spectra for first and second order modulators.

FIG. 17 shows the ACRDCL line-to-line voltage and line current waveforms for the first order modulator. FIG. 18 shows results of the same signals for the second order modulator. The spectra of the line-line voltage for both modulators are shown in FIG. 19 for the ACRDCL. Comparison between the two modulators shows that up to approximately 500 Hz the modulation noise for the first order modulator is approximately 5 dB less than that of the second order modulator. Beyond 500 Hz, the second order modulator shows approximately 7–10 dB of modulation noise improvement, with a maximum improvement of 12 dB at 2 kHz.

As has already been mentioned, the present invention is not limited in application to the DC resonant ink inverter of FIG. 1 nor to the inverter control system of FIG. 12 but may be applied to a variety of resonant link inverters and control systems for such inverters. The modulator of the present invention may be applied to matrix converters, multi-level converts and multi-phase converters. The modulator of the present invention could be applied to non-resonant link type inverters, however, the discrete pulse modulation scheme employed is not optimal in cases where traditional pulse width modulation may be employed. The modulator of the present invention is, therefore, not limited to the particular embodiments disclosed herein, but embraces such modified forms thereof as come within the scope of the following claims.

What is claimed is:

1. A modulator for a resonant DC link converter including switching devices to be switched between a finite number of switching states to connect a converter bus to outputs of the converter and a means for providing zero voltage or zero current switching conditions on the bus, comprising:

(a) a linear system having as inputs at least two reference waveform signals and two feedback waveform signals and having as outputs at least two linear system signals, each linear system signal being derived from a difference between one of the reference waveform signals and one of the feedback waveform signals;

(b) a vector quantizer having as inputs the linear system signals and providing a discrete switching state signal as an output wherein there are a finite number of different switching state signals corresponding to switching states of the converter and where the quantizer continuously maps the linear state signals to one of the switching state signals such that the switching state signal depends on a combination of all of the linear state signals;

(c) a latching means having as inputs the switching state signal and a clocking signal which indicates one of zero voltage or zero current switching conditions in the converter and providing as an output a control signal which is equal to the switching state signal at points in time defined by the clocking signal and wherein the control signal is usable for both controlling the switching devices of the converter such that the outputs of the converter are driven to match the reference waveforms and for deriving the feedback waveform signals.

2. The modulator of claim 1 wherein the reference waveform signals represent desired AC voltage waveforms.

3. The modulator of claim 1 wherein the reference waveform signals represent desired AC current waveforms.

4. The modulator of claim 1 wherein the linear system is a second order system.

5. The modulator of claim 4 wherein the linear system includes means for implementing the noise shaping filter H in continuous time, where the filter H is defined in discrete time as:

$$H = \frac{z^{-1}(z^{-1} - 2)}{1 - 2Z^{-1} + z^{-2}} I$$

where I is an identity matrix of appropriate dimensions.

6. The modulator of claim 1 wherein the switching state signal is a multi-bit digital signal and wherein at least one of the bits of the multi-bit signal depends upon at least two of the linear system signals.

7. The modulator of claim 1 comprising additionally feedback derivation means for deriving the feedback waveform signals from the control signal.

8. The modulator of claim 7 wherein the feedback derivation means includes means for sensing the outputs of the converter.

9. A modulator for a three-phase resonant link converter having a resonant link which periodically drives a DC bus line to zero volts to provide zero voltage switching conditions, and switching devices to be switched between a finite number of switching states for connecting the DC bus line to three converter output lines, comprising:

(a) a linear system having as inputs at least two reference waveform signals representative of desired output signals on the output lines of the converter and at least two feedback waveform signals representative of actual output waveforms on the output lines of the converter corresponding to the reference waveform signals, and having as outputs at least two linear system signals, each linear system signal being derived from a difference between one of the reference waveform signals and a corresponding feedback waveform signal;

(b) a vector quantizer having as inputs the linear system signals and providing a unified multi-bit digital switching state signal as an output wherein there are no more than seven different switching state signals corresponding to switching states of the converter and where the quantizer continuously maps the linear state signals to one of the switching state signals such that at least one bit of the multi-bit switching state signal depends on the combination of at least two of the linear state signals;

(c) a latching means having as inputs the multi-bit digital switching state signal and a clocking signal which indicates zero voltage switching conditions in the converter and providing as an output a multi-bit control signal which is equal to the switching state signal at points in time defined by the clocking signal which causes the switching state signal to be latched when the DC bus line is at zero volts and wherein the control signal is useable for both controlling the switching devices of the converter such that the outputs of the converter are driven to match the reference waveforms and for deriving the feedback waveform signals.

10. The modulator of claim 9 wherein a first reference waveform signal represents a desired AC voltage waveform at a first output line of the converter with respect to a neutral line and a second reference waveform signal represents a desired AC voltage waveform at a second output line of the converter with respect to the neutral line.

11. The modulator of claim 9 wherein a first reference waveform signal represents a desired AC voltage waveform between each output line of a first pair of output lines of the converter and a second reference waveform signal represents a desired AC voltage waveform between each output line of a second pair of output lines of the converter.

12. The modulator of claim 9 wherein the reference waveform signals represent desired AC current waveforms on the output lines of the converter.

13. The modulator of claim 9 wherein the linear system is a second order system.

14. The modulator of claim 13 wherein the linear system includes means for implementing the noise shaping filter H in continuous time, where the filter H is defined in discrete time as:

$$H = \frac{z^{-1}(z^{-1}-2)}{1-2z^{-1}+z^{-2}} I$$

where I is an identity matrix of appropriate dimensions.

15. The modulator of claim 14 wherein the means for implementing the filter H includes two series connected pairs of amplifiers.

16. The modulator of claim 15 comprising additionally clippers placed on integration capacitors of the amplifiers to stabilize the modulator.

17. The modulator of claim 9 wherein the switching state signal is a three bit digital signal.

18. The modulator of claim 9 wherein there are no more than six different switching state signals.

19. The modulator of claim 9 comprising additionally feedback derivation means for deriving the feedback waveform signals from the control signal.

20. The modulator of claim 19 wherein the feedback derivation means includes a demultiplexer having the multi-bit control signal as an address input for selecting a demultiplexer output which is a feedback waveform signal corresponding to a signal on an output of the converter resulting from application of the control signal to the converter switching devices.

21. A power converter for converting DC power to AC power comprising:

(a) a resonant circuit adapted to receive a DC power input and having a DC bus providing an output voltage from the resonant circuit;

(b) means for causing the resonant circuit to oscillate stably at or below its resonant frequency and for the voltage across the DC bus to be maintained at an average DC level and to go to zero voltage at least once during each cycle of oscillation of the resonant circuit;

(c) means for providing a clocking signal when the DC bus goes to zero voltage;

(d) a three phase inverter connected to receive the voltage on the DC bus and having gated switching devices which may be switched between a finite number of switching states to switch the DC bus unto three converter output lines so as to synthesize a three phase AC output waveform;

(e) a linear system having as inputs at least two reference waveform signals representative of desired output signals on the output lines of the converter and at least two feedback waveform signals representative of actual output waveforms on the output lines of the converter corresponding to the reference waveform signals, and having as outputs at least two linear system signals, each linear system signal being derived from a difference between one of the reference waveform signals and a corresponding feedback waveform signal;

(f) a vector quantizer having as inputs the linear system signals and providing a unified multi-bit digital switching state signal as an output wherein there are no more than seven different switching state signals corresponding to switching states of the converter and where the quantizer continuously maps the linear state signals to one of the switching state signals such that at least one bit of the multi-bit switching state signal depends on the combination of at least two of the linear state signals;

(g) a latching means having as inputs the multi-bit digital switching state signals and the clocking signal and providing as an output a multi-bit control signal for controlling the switching devices which is equal to the switching state signal at points in time defined by the clocking signal which causes the switching state signal to be latched when the DC bus line is at zero volts and wherein the control signal is usable for both controlling the switching devices of the converter such that outputs of the converter are driven to match the reference waveforms and for deriving the feedback waveform signals.

22. The power converter of claim 21 wherein a first reference waveform signal represents a desired AC voltage waveform at a first output line of the converter with respect to a neutral line and a second reference waveform signal represents a desired AC voltage waveform at a second output line of the converter with respect to the neutral line.

23. The power converter of claim 21 wherein a first reference waveform signal represents a desired AC voltage waveform between each output line of a first pair of output lines of the converter and a second reference waveform signal represents a desired AC voltage waveform between each output line of a second pair of output lines of the converter.

24. The power converter of claim 21 wherein the reference waveform signals represent desired AC current waveforms on the output lines of the converter.

25. The power converter claim 21 wherein the linear system is a second order system.

26. The power converter of claim 25 wherein the linear system includes amplifiers connected to implement the noise shaping filter H in continuous time, where the filter H is defined in discrete time as:

$$H = \frac{z^{-1}(z^{-1} - 2)}{1 - 2z^{-1} + z^{-2}} I$$

where I is an identity matrix of appropriate dimensions.

27. The power converter of claim 21 wherein the switching state signal is a three bit digital signal.

28. The power converter of claim 21 wherein there are no more than six different switching state signals.

29. The power converter of claim 21 comprising additionally feedback derivation means for deriving the feedback waveform signals from the control signal.

30. The power converter of claim 29 wherein the feedback derivation means includes a demultiplexer having the three bit control signal as an address input for selecting a demultiplexer output which is a feedback waveform signal corresponding to a signal on an output of the converter resulting from application of the control signal to the converter switching devices.

31. The power converter of claim 21 additionally comprising a gating circuit which receives the control signal as an input and which drives the switching devices in response to the control signal.

32. A method for modulating a power conversion circuit including switching devices to be switched between a finite number of switching states to connect a converter bus to output lines of the power conversion circuit and means for providing zero voltage or zero current switching conditions on the bus, comprising the steps of:

(a) comparing at least two reference waveform signals representative of desired output signals on the output lines of the conversion circuit with at least two feedback waveform signals representative of actual output waveforms on the output lines of the conversion circuit corresponding to the reference waveform signals;

(b) deriving at least two linear system signals from the comparison of the reference waveform signals and corresponding feedback waveform signals;

(c) mapping the linear system signals to a unified multi-bit digital switching state signal corresponding to one of the finite number of switching states such that at least one bit of the switching state signal depends on a combination of at least two of the linear state signals;

(d) latching the multi-bit digital switching state signal in response to a clocking signal which indicates one of zero voltage or zero current switching conditions in the power conversion circuit to provide a multi-bit control signal which is equal to the switching state signal at points in time defined by the clocking signal and which is usable for both controlling the switching devices of the power conversion circuit such that outputs of the conversion circuit are driven to match the reference waveforms and for deriving the feedback waveform signals.

33. The method of claim 32 wherein a first reference waveform signal represents a desired AC voltage waveform at a first output line of the conversion circuit with respect to a neutral line and a second reference waveform Signal represents a desired AC voltage waveform at a second output line of the conversion circuit with respect to the neutral line.

34. The method of claim 32 wherein a first reference waveform signal represents a desired AC voltage waveform between each output line of a first pair of output lines of the conversion circuit and a second reference waveform signal represents a desired AC voltage waveform between each output line of a second pair of output lines of the conversion circuit.

35. The method of claim 32 wherein the reference waveform signals represent desired AC current waveforms on the output lines of the conversion circuit.

36. The method of claim 32 wherein the linear system signals are derived using a filter of at least second order.

37. The method of claim 32 further comprising the additional step of deriving the feedback waveform signals from the multi-bit control signal.

38. The method of claim 32 further comprising the additional step of applying the multi-bit control signal to switching devices of the power conversion circuit.

* * * * *

UNITED STATES PATENT AND TRADEMARK OFFICE
CERTIFICATE OF CORRECTION

PATENT NO.    : 5,619,406
DATED         : April 8, 1997
INVENTOR(S)   : Glen A. Luckjiff, et al.

It is certified that error appears in the above-indentified patent and that said Letters Patent is hereby corrected as shown below:

Column 1, line 3, after the title insert the following:

This invention was made with United States government support awarded by NSF, Grant # NSF Project #1713. The United States Government has certain rights in this invention.

Signed and Sealed this

Twelfth Day of August, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   :   5,619,406
DATED        :   April 8, 1997
INVENTOR(S)  :   Divan, et al.

It is certified that error appears in the above-identified patent and that said Letters Patent is hereby corrected as shown below:

In column 4, line 27 of the patent, delete "T = 1/f" and insert in its place -- $T = 1/f_s$ --

In column 7, line 22 of the patent, before "FIG. 17" insert a paragraph indent

In column 10, line 44 of the patent, delete "is"

In column 11, line 37 of the patent, delete "implements" and insert in its place -- implementing --

UNITED STATES PATENT AND TRADEMARK OFFICE
CERTIFICATE OF CORRECTION

PATENT NO. : 5,619,406
DATED : April 8, 1997
INVENTOR(S) : Divan, et al.

It is certified that error appears in the above-identified patent and that said Letters Patent is hereby corrected as shown below:

In column 12, line 50, delete "$S_{a-c}$" and insert in its place -- $s_{a-c}$ --

In column 18, line 57, Claim 21, delete "signals" and insert in its place -- signal --

In column 20, line 28, Claim 33, delete "Signal" and insert in its place -- signal --

Signed and Sealed this

Sixteenth Day of February, 1999

Attest:

*Acting Commissioner of Patents and Trademarks*

*Attesting Officer*